United States Patent [19]

Steinemann

[11] 4,228,787
[45] Oct. 21, 1980

[54] SOLAR HEATER, BUILDING CLADDING UNIT

[75] Inventor: Hans Steinemann, Grossbuch, Switzerland

[73] Assignee: Micafil, AG, Zurich, Switzerland

[21] Appl. No.: 832,024

[22] Filed: Sep. 9, 1977

[30] Foreign Application Priority Data

Sep. 10, 1976 [CH] Switzerland .................. 11504/76

[51] Int. Cl.³ ............................................. F24J 3/02
[52] U.S. Cl. ................................ 126/433; 126/429; 126/431; 126/901
[58] Field of Search ............... 126/270, 271, 433, 901, 126/432, 431, 428, 429, 419; 237/1 A; 98/88 R; 165/105, 485

[56] References Cited

U.S. PATENT DOCUMENTS

| 2,288,465 | 6/1942 | Knudsen | 126/270 |
|---|---|---|---|
| 2,484,127 | 10/1949 | Stelzer | 237/1 A |
| 2,559,871 | 7/1951 | Gay | 237/1 A |
| 3,288,206 | 11/1966 | Beeler | 126/270 X |
| 3,799,144 | 3/1974 | Ramsey et al. | 126/270 |
| 3,952,947 | 4/1976 | Saunders | 126/270 |
| 3,964,678 | 6/1976 | O'Hanlon | 126/270 |
| 3,990,635 | 11/1976 | Restle et al. | 126/270 |
| 3,996,919 | 12/1976 | Hepp | 237/1 A |
| 4,054,125 | 10/1977 | Eckels | 126/270 |
| 4,059,093 | 11/1977 | Knowles et al. | 126/443 |

OTHER PUBLICATIONS

Counihan, Solar Energy Controls, *IBM Technical Disclosure Bulletin*, vol. 19, No. 12, pp. 4514–4515, May 1977.

*Primary Examiner*—James C. Yeung
*Assistant Examiner*—Larry Jones
*Attorney, Agent, or Firm*—Burns, Doane, Swecker & Mathis

[57] ABSTRACT

A heat-protective building cladding unit in which a frame carries two spaced apart transparent sheets. One or more movable members are arranged in the space between the transparent sheets for selective movement. The movable member may thus be moved selectively to permit or prevent solar radiation from passing between the two transparent sheets. The unit is mounted to enclose a selected area of a building wall onto which a selective absorbing layer has been applied. Heat is conducted from the selective layer to the building interior by heat pipes or a circulating fluid.

13 Claims, 9 Drawing Figures

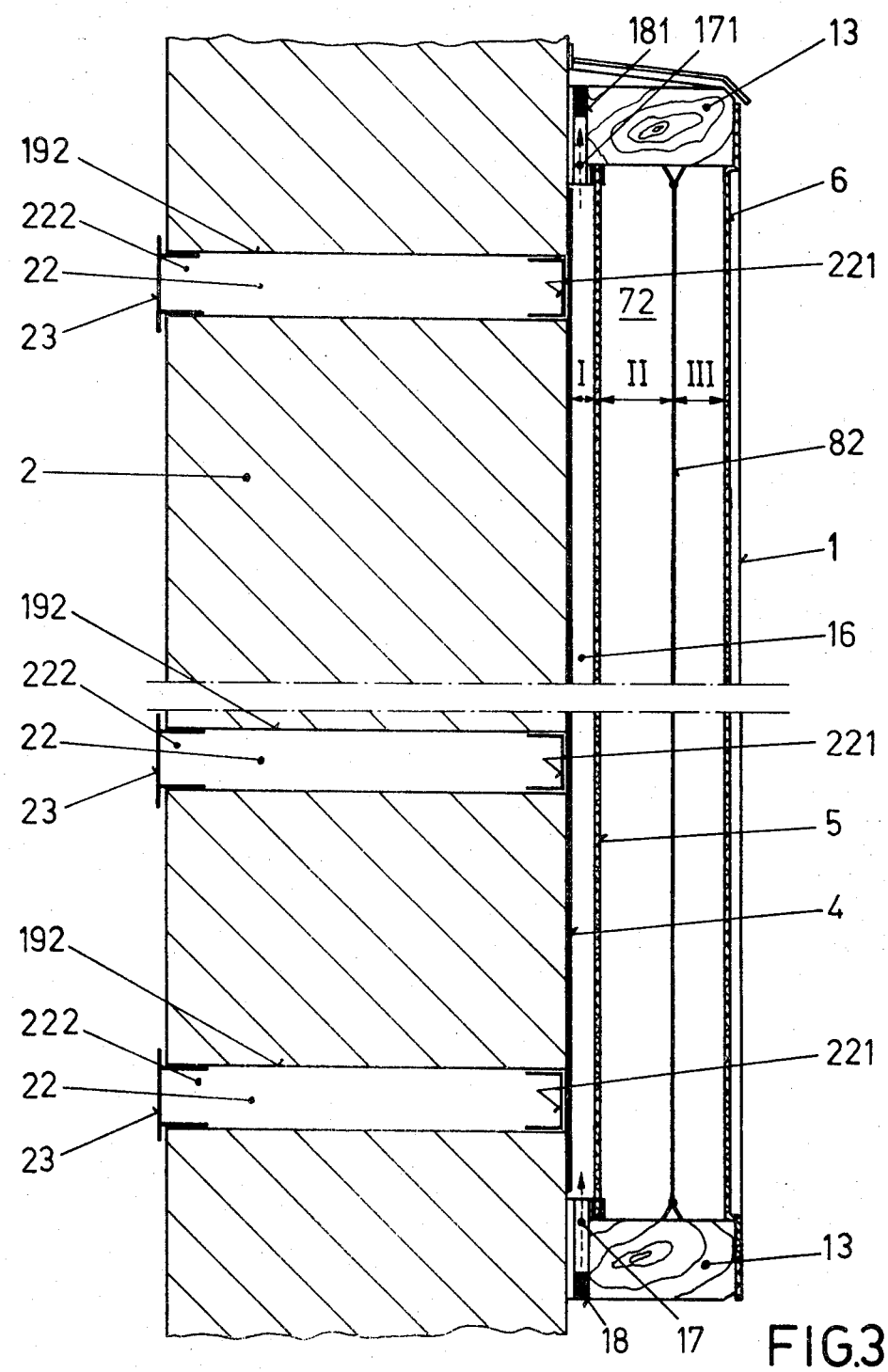

SOLAR HEATER, BUILDING CLADDING UNIT

This invention relates to a heat-protective outer cladding for a building, consisting of individual elements which serve for heating, cooling and thermal insulation of masonry as well as for heat transmission and which are fitted on the outer wall of a building enclosing the masonry.

It is already known to construct an outer cladding of sun-shielding elements, the inner side of the window being provided with a reflective foil, from which the radiation is almost 100% reflected.

This sun and heat protection is arranged as a foil shutter held in guides either between the panes of the window glazing or on the inner side of the window-frame, and may be operated by hand or may be motorised.

These known arrangements, which are directed almost exclusively towards heat protection against excessive inward radiation of heat, do not however make possible any more complex thermal control of the space within a building.

The purpose of the invention is to provide a further advantageous extension of the known thermal energy management of a building in accordance with the temperature conditions and the solar radiation, which may largely replace expensive air conditioning.

In accordance with the present invention there is provided a heat-protective building cladding unit comprising a frame carrying two spaced apart transparent sheets having in the space therebetween one or more movable members arranged for movement such as selectively to permit or prevent solar radiation from passing between said sheets.

The invention further provides a thermally protective building cladding comprising at least one cladding unit in accordance with the preceding paragraph mounted upon an outer wall of a building, the outer surface of said wall being covered by a selective layer as herein defined, so as to form an air space between said surface and the innermost of said transparent sheets.

It is particularly advantageous if the coil consists of a foil, preferably of plastics material, that can be rolled up and unrolled, which includes at least one reflective section and at least one transparent section.

In accordance with a preferred embodiment the foil arrangement may consist of axially rotatable unkinkable strips, preferably of plastics material, which have at least one reflective surface.

Through these measures the prerequisites are provided which make it possible to provide an appropriate combination of the positions of adjustment of reflective and/or transparent foil sections, in accordance with the climatic conditions and with the heat required at any time.

It is further suitable for the selective layer to consist of a deep black copper monoxide.

By means of this highly efficient selective coating, by which the present specification and the appended claims a coating which converts the incident solar radiation almost completely into infra-red energy, the masonry is heated. This infra-red thermal energy remains substantially behind the side adjacent the masonry of the inner transparent sheet, since this acts as a mirror for the infra-red radiation.

It is recommended that the outer transparent sheet shall consist of a glass-fibre reinforced plastics material that is opaque to ultra-violet (UV) radiation.

As a result the working life of the plastics foil, which may for example be an ultra-violet resistance polyester foil, may be further substantially increased.

In accordance with a preferred embodiment, an interspace between the selective layer and the inner transparent sheet may be formed as an air space, which is provided at its upper and lower ends with ventilating slots covered with close mesh and is preferably connected by means of access channels with the interior space of the building.

It is advantageous to provide an air blower and an air damper in the access channels.

Through these measures the heat resulting in the cladding element may be conducted into the interior of the building either by thermal conduction through the masonry or by forced ventilation. It is also possible to cool the masonry, over-heated during daytime in summer, by the cooler night air.

In accordance with a further extension of the invention there are provided in the access channels heat pipes of known kind, which are preferably arranged inclined to the vertical, the evaporator part of each heat pipe being in thermal connection with the selective layer and the condenser portions in thermal connection with a heat exchanger serving as a heater body for the space within the building.

The interior space heater body may be constructed as an air heat exchanger or as a conventional water heat exchanger connected with the water heating installation of the building.

In accordance with a further embodiment there is provided for the unrolling and rolling up of the plastics foil a self-regulating motor drive which is advantageously coupled with the control for the blower, and is preferably controlled by a servo mechanism responsive to the temperatures inside and outside the building.

Embodiments of the invention are shown in a simplified manner in the accompanying drawings, in which:

FIG. 3 shows a vertical cross-section through a thermal protection building cladding arrangement including a foil arrangement consisting of strips and heat transmission by means of heat pipes;

In all the Figures of the drawings similar parts are denoted by the same reference numerals.

Figure 1:
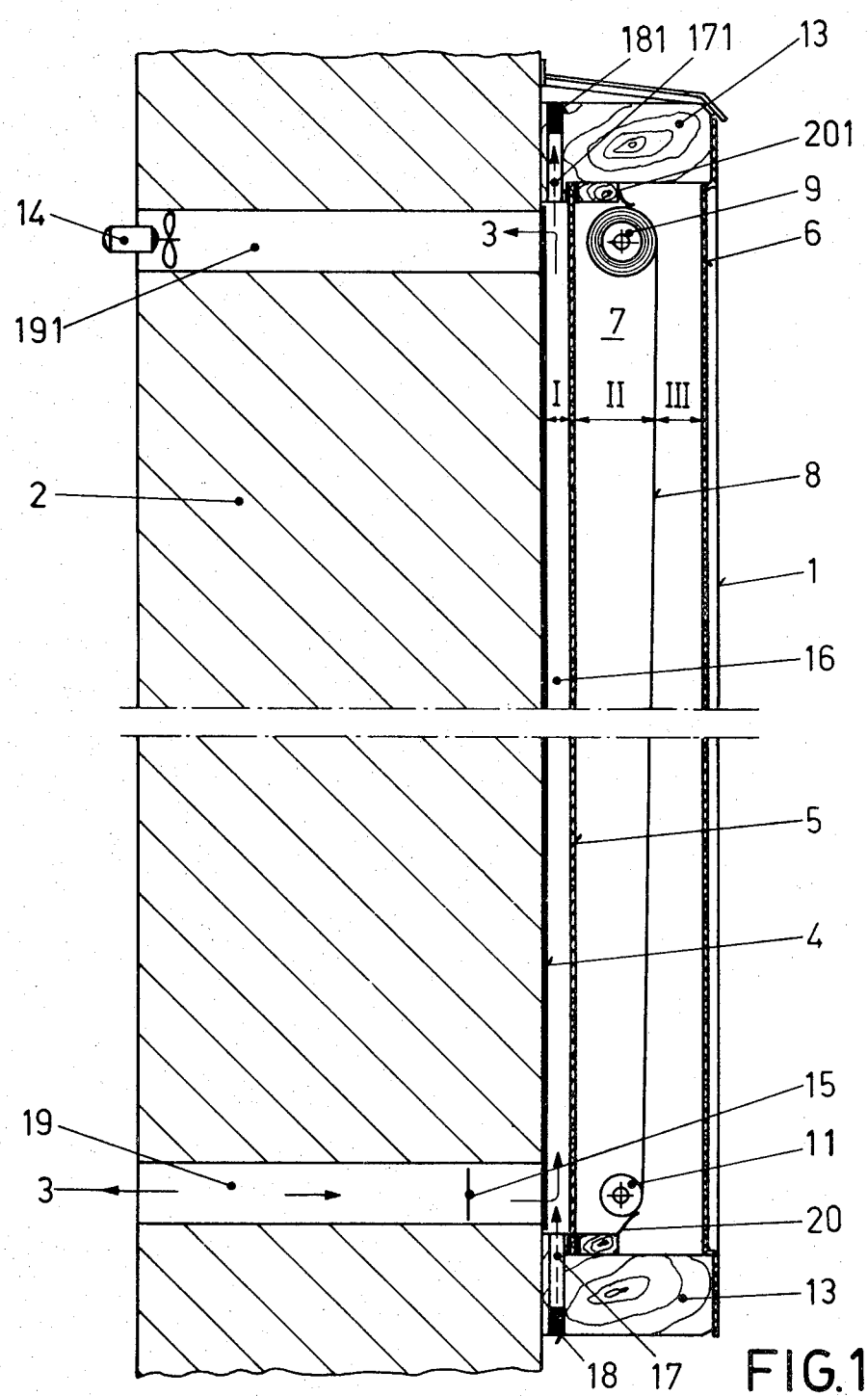
FIG. 1 shows a vertical cross-section through a thermal protection building cladding arrangement including a foil arrangement with simple foil guiding means.
Figure 2:
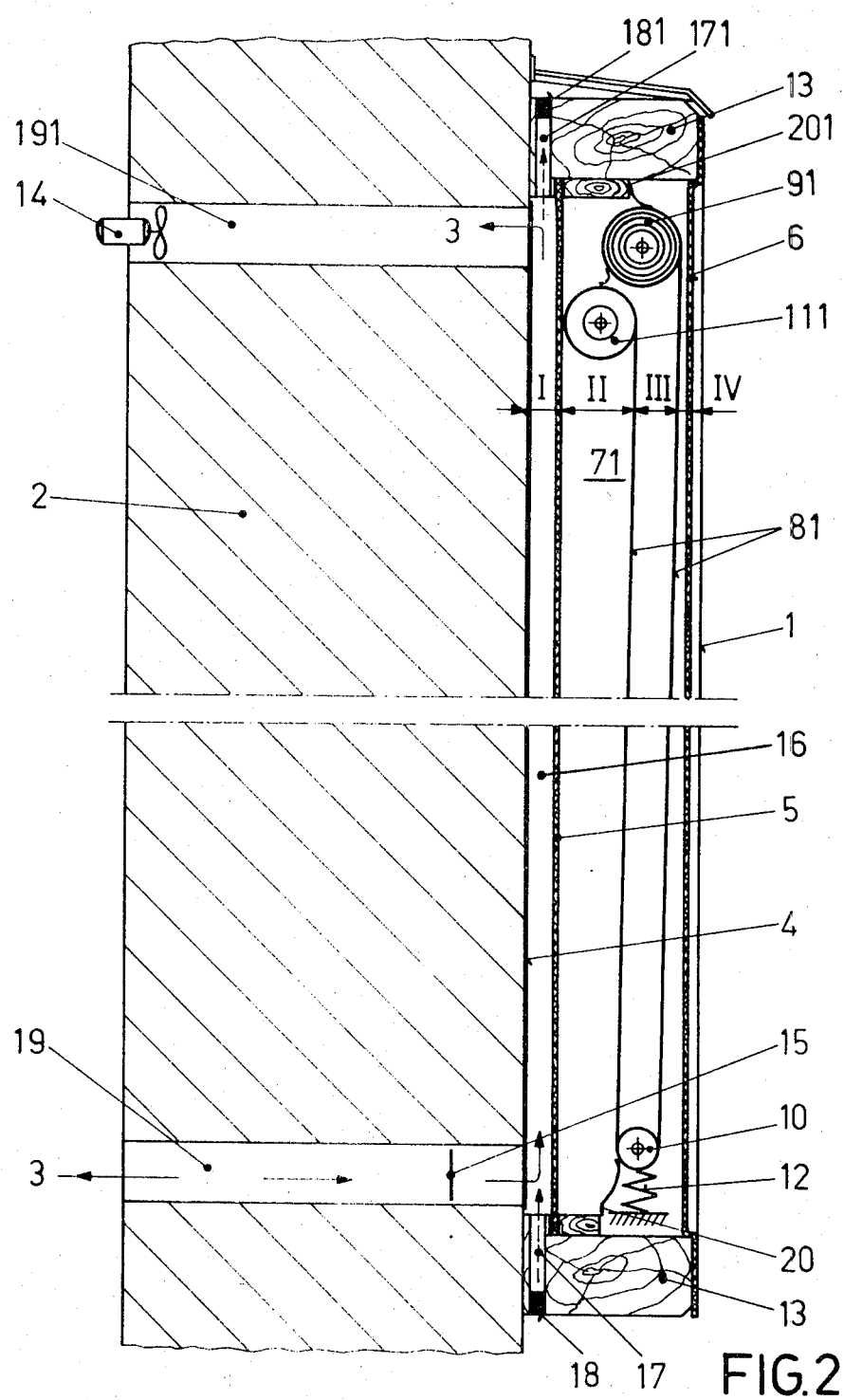
FIG. 2 shows a vertical cross-section through a thermal protection building cladding arrangement including foil guiding means which doubles the foil.

As shown in FIGS. 1 and 2 the outer wall 2 of a building, of unplastered masonry, is covered by a selective layer 4 to which is secured a cladding element 1. Each cladding element 1 is formed by a frame 13 with at least two mutually spaced-apart transparent sheets 5, 6, which consist of glass, plastics, or the like. In the space thus formed between the transparent sheets 5, 6 there is disposed a foil arrangement 7, 71 which consists of a foil 8, 81 arranged to be unrolled or rolled up, as may be seen by way of example in the two embodiments of FIGS. 1 and 2.

As shown in FIG. 1 the foil arrangement 7 consists of a winding roller 9 for rolling up and unrolling a plastics foil 8, and a spring roller 11 onto which the foil 8 is rolled. The foil 8 is about twice as long as the height of the cladding element and half of it consists of a transparent foil section t and half of a reflecting foil section r. Between the outer transparent sheet 6, the plastics foil 8 and the inner transparent plate 5 there are thus formed three heat restricting zones, I, II and III.

FIG. 2 shows a foil arrangement 71 which is a modification of the embodiment of FIG. 1, which consists of a winding roller 91, a guide roller 10 with a spring 12 serving to tension the plastics foil 81 and a spring roller 111. The plastics foil 81 has a length some four times the height of the cladding element, one quarter of the foil length being constructed as a reflective section r and three-quarters of the foil length as a transparent section t. Between the outer transparent plate 6, the (for example) double layer of plastics foil 81 and the inner transparent plate 5 there are formed four heat-restricting zones I, II, III and IV.

In both of the embodiments shown in FIGS. 1 and 2 a self-regulating motor drive may be used for unrolling and rolling up the plastics foil 8, 81. Such self-regulating motor drives are well known and further description or illustration is therefore considered to be unnecessary. Thus for example roller-blind miniature motors may be employed for inclusion in the winding rollers 9, 91 for unrolling and rolling up the plastics foils and even manual operation may be employed for the necessary operation of the plastics foils 8, 81. The cladding element 1 is constructed so that between the outer wall of the masonry 2, coated with the selective layer 4 and the inner transparent sheet 5 there is provided an interspace forming an air circulating duct 16, which at each of the lower and upper ends of the cladding element includes a ventilation slot 17, 171 covered with fine mesh. The air circulating duct 16 is connected with the space 3 within the building by way of access channels 19, 191. A blower 14 for air circulation is arranged in the access channel 191 and the access of air may be controlled by a damper 15. The regulation of the blower 14 may be coupled with the servo-control of the foil drive. In order to avoid undesirable circulation of air within the space between the transparent sheets 5, 6 and the plastics foils 8, 81, a seal 20, 201 respectively is arranged between each of the spring rollers 11 and the spring biased guide roller 10 and the lower member 13a of the frame 13 and between the winding rollers 9, 91 and the upper member 13b of frame 13.

FIG. 3 shows a foil arrangement 72 which consists of axially rotatable unkinkable strips 82 arranged for rotation about respective axes which may for example be vertical, as shown. The strips 82 are provided on at least one and preferably on both sides with a reflective surface r. At the same time an arrangement alternative to that shown in FIGS. 1 and 2 for the transfer of heat into the space 3 within the building is shown, in that heat pipes 22 are provided in access channels 192. The evaporator portion 221 of the heat-pipe 22 is in each case thermally connected with the selective layer 4 and each condenser portion 222 is thermally connected with a heat exchanger serving as a heater body 23 for the space within the building.

The manner in which the invention operates will be further explained with reference to the drawings. The two foil arrangements represented in FIGS. 1 and 2 on the one hand improve the thermal insulation of the masonry 2 in known manner by the formation of several successively disposed heat restraining zones I–III (FIG. 1) or I–IV (FIG. 2) and on the other hand through positional adjustment in accordance with the invention of a plastics foil 8, 81, consisting in each case of a reflective section r and one or more transparent sections t, control the solar radiation falling upon the outer wall of the building, which may thereafter be converted into infra-red energy in the selective layer 4. The selective layer 4, consists for example of a deep black copper monoxide. This most effective selective layer 4 may for example be deposited on the outer wall of the masonry for example by a precipitation method, that is, by first preparing $Cu(OH)_2$ and subsequent conversion into CuO, preferably under the influence of slight heating.

During daytime, in direct solar radiation and even in diffuse daylight, thermal energy may thus be derived and stored in the masonry and at night-time a reduction in the loss of heat and a reduction of the thermal radiation may be produced by increased thermal restraint. The foil arrangement 7 in accordance with FIG. 1 may be controlled so that when the internal temperature $T_I$ is higher than the external temperature $T_o$ the reflective section r of the plastics foil 8 in the cladding element 1, is disposed in front of the masonry 2 and when the external temperature is higher than the internal temperature $(T_o > T_I)$, the transparent section t of the foil is so disposed.

For $T_o > T_I$ the suns ray pass through the transparent section t of plastics foil 8 to the selective layer 4, covering the outer surface of the masonry 2, which converts the incident radiation into infra-red energy by which the masonry 2 is heated. The high capability of absorption of the incident radiation is to be attributed to the fact that the inner transparent sheet reflects the infra-red radiation. After a temperature rise in the operating region of the selective layer to above 20° C. ($T_S > 20°$ C.) if internal heating is required cooler air may be heated in the air channel 16 at the selective layer 4 and led away through the access channels 19, 191 into the space 3 within the building.

FIG. 2 shows a modification, in which as compares with FIG. 1 a double length of plastics foil 81 is employed. By this means the number of heat-restricting zones is increased from three to four. In both embodiments a UV-radiation resistant polyester foil 8, 81 may for example be employed. The outer transparent sheet 6 may advantageously consist of a glass-fibre/plastics material opaque to UV-radiation, so that the foils 8, 81 may be additionally protected against UV radiation.

Figures 2A, 2B, 2C:
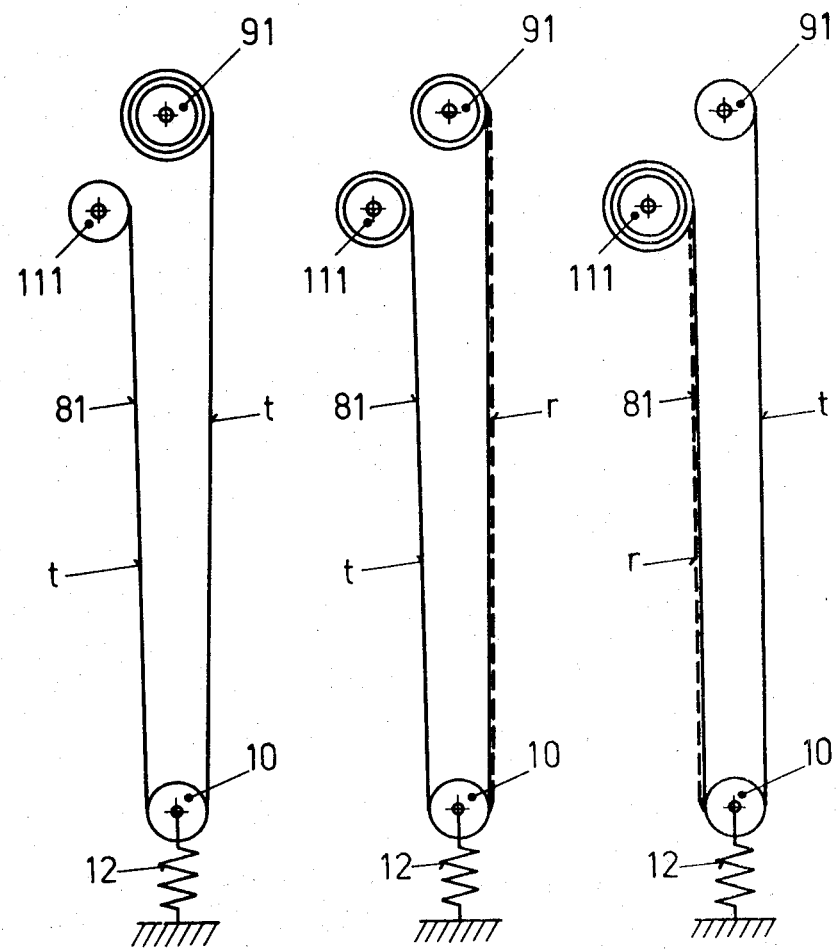
FIGS. 2a, 2b and 2c are simplified diagrams illustrating the foil of the embodiment of FIG. 2 in three different conditions of adjustment.

For further explanation of the mode of operation the three states of adjustment shown in FIGS. 2a to 2c of the embodiment of FIG. 2 will be considered. In the first condition, as shown in FIGS. 2 and 2a the building is to be heated, the external temperature being higher than that of the masonry $(T_o > T_I)$, that is, sufficient solar radiation is present for the internal temperature to be able to be raised. The position of the foil sections r and t of foil 81 is adjusted so that the first two transparent sections of the length of foil 81 are disposed one behind the other in the cladding element, one between the spring roller and the spring biased deflection roller 10 and the other between the guide roller 10 and the winding roller 91. The second half of the length of foil, consisting of a reflective and a transparent section, remains on the roller 91. In this state of adjustment of the length of foil the solar radiation can pass through the transparent sections t of the foil 81 to the selective layer 4 and after conversion into infra-red energy may penetrate the masonry.

In the second case, illustrated by FIGS. 2 and 2b, the room temperature is to be held cooler than the temperature of the masonry 2, while the external temperature and the solar radiation present are similar to these in the first case, i.e. $T_o > T_I$. In this case the first transparent section t of the length of foil 81 is rolled on to the spring roller 111, the second transparent section t of the length of foil 81 is stretched between the spring roller 111 and the spring biased guide roller 10 and the third, reflective section r of the length of foil 81 is positioned between the guide roller 10 and the winding roller 91, the reflective section r of the foil length is arranged with its metal coated surface outwards and finally the fourth, transparent section t of the length of foil 81 remains rolled on the winding roller 91. The incident solar radiation is reflected from the reflective section r of the length of foil 81, so that the room temperature can be held lower than the external temperature. This position of adjustment also protects the high efficiency selective layer 4, especially in summer when dangerously high temperatures could otherwise arise in these conditions.

In the third case, as shown in FIGS. 2 and 2c, cooling of the masonry 2 is prevented when the external temperature is lower than the temperature of the masonry ($T_o > T_I$) and also there is no solar radiation. In this case the first and second transparent sections t of the length of foil 81 are rolled upon the spring roller 111, the third, reflective section r of the length of foil 81 extends between the spring roller 111 and the resiliently biased guide roller 10, the metal coated surface of this section being directed inwards, and the fourth, transparent section t of the length of foil 81 extends between the spring biased guide roller 10 and the winding roller 91. Thus radiation of heat outwardly from the thermal energy present in the effective region of the selective layer 4 is prevented, since the reflective section r reflects the radiated heat inwards.

Figure 3A:
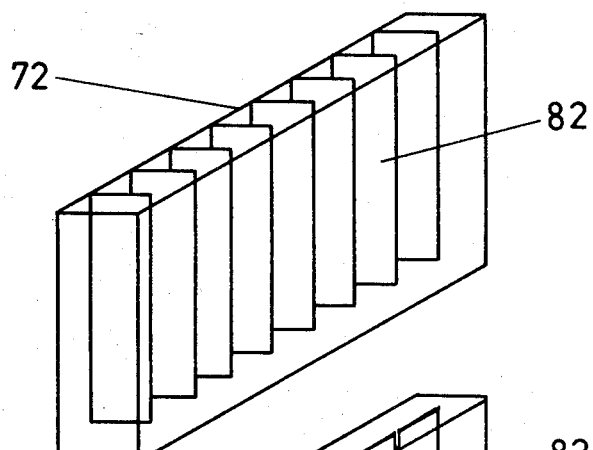
FIGS. 3a, 3b and 3c are simplified diagrams showing in perspective three different states of adjustment of the foil strips of the embodiment of FIG. 3.

The foil arrangement shown in FIGS. 3 and 3a-3c with for example vertically extending, axially rotatable unkinkable strips 82 operates in the following manner:

FIG. 3a shows an open position of adjustment of the strips 82, in which only the very narrow end faces of the strips 82 are directed outwards and almost 100% of the solar radiation reaches the selective layer 4; this corresponds with the state of adjustment shown in FIG. 2a with the transparent foil sections t arranged in front of the selective layer.

Figure 3B:
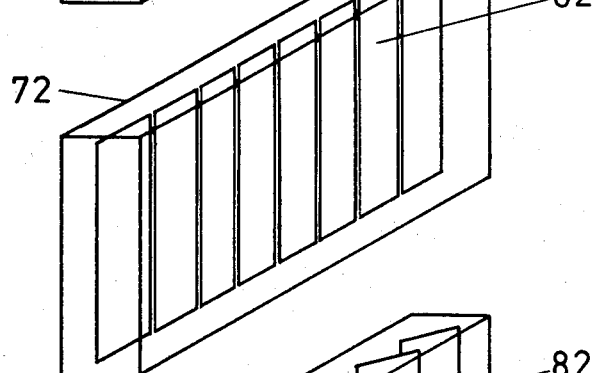

FIGS. 3 and 3b similarly show the strips 82 in a closed position, so that the outwardly reflective surfaces of these strips reflect the incident solar radiation outwards and the room temperature can be held lower than the external temperature. The position of adjustment of the strips 82 corresponds to FIG. 2b with the reflective foil section r reflecting outwardly. If the strips 82 are provided on both sides with a reflective surface r, radiation of heat outwards in the closed position of adjustment of the strips 82 is prevented, as in accordance with FIG. 2c through the inwardly facing reflective foil section r.

Figure 3C:
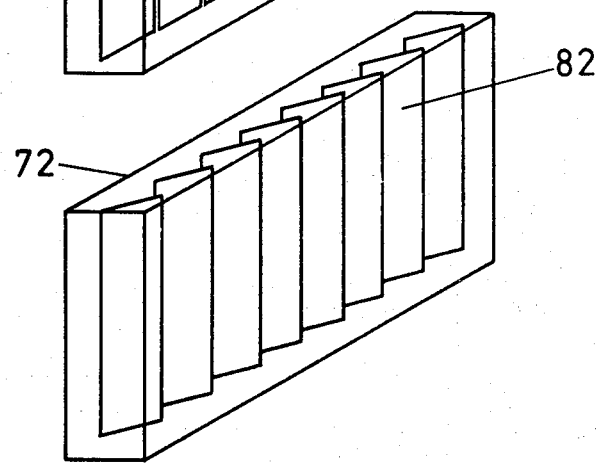

By appropriate axial rotation of the strips the fractions of the solar radiation which respectively penetrate to the selective layer 4 and are reflected outwardly may be controlled, for example in the ratio $\frac{3}{4}:\frac{1}{4}$ as illustrated in FIG. 3c.

Instead of being constructed with vertically extending strips 82, the foil arrangement 72 could alternatively be made with horizontally extending strips.

The arrangement of the heat pipes 22, known in themselves, is advantageous even when operation is intermittent owing to fluctuating solar radiation, since the heat pipe 22 with its low heat capacitor can be heated very rapidly. The condenser portion 22 of each heat pipe 22 may be connected with a heater body 23 for the internal space, which may be constructed either as an air heat exchanger or as a water heat exchanger.

Buildings which are equipped with this heat protective cladding have, as compared with buildings carried out in the usual manner, a much more uniform internal temperature. Very often a heat protective cladding of this kind can efficiently replace an expensive air-conditioning installation demanding high energy to drive it.

The presently disclosed embodiment is to be considered in all respects as illustrative and not restrictive. The scope of the invention is indicated by the appended claims rather than the foregoing description, and all changes which come within the meaning and range of equivalency of the claims are therefore intended to be embraced therein.

What we claim is:

1. A solar heated, thermally protective building cladding comprising:
    a building having an outer wall;
    a portion of an outer surface of the wall being covered by a selective absorbing layer;
    a plurality of heat pipes disposed in the wall in thermal communication with the selective absorbing layer, the pipes extending between the layer and the interior of the building;
    a frame carrying two spaced-apart transparent sheets having in the space therebetween one or more movable members arranged for movement to selectively permit or prevent solar radiation from passing between said sheets; and
    the frame being mounted upon the outer wall of the building enclosing the layer so as to form an air space between the layer and the innermost of said transparent sheets.

2. A cladding unit in accordance with claim 1 wherein said one or more movable members are elongate foil members between said transparent sheets and mounted on a roller so as to present either a reflective or a transparent portion thereof between said sheets in response to movement of the roller.

3. A cladding unit in accordance with claim 2 wherein said one or more movable members comprise a plastics material.

4. A cladding unit in accordance with claim 2 wherein said foil member is movable so as to present a reflective surface thereof towards one or towards the other of said transparent sheets, or to present only transparent portions thereof between said sheets.

5. A cladding unit in accordance with claim 1 wherein said one or more movable members comprises, between said sheets, a plurality of strips each having at least one reflective surface, said strips being mounted for movement about parallel axes between positions in which said reflective surfaces form a substantially continuous reflector and mutually parallel positions in which solar radiation may pass substantially uninterrupted therebetween.

6. A cladding unit in accordance with claim 1 wherein one of said sheets is opaque to ultra-violet light.

7. A cladding in accordance with claim 1 wherein said selective layer comprises copper monoxide.

8. A cladding in accordance with claim 1 wherein said heat pipes are inclined to the vertical.

9. A cladding in accordance with claim 1 wherein each said heat pipe includes an evaporation portion in thermal communication with said selective layer and a condenser portion thermally coupled to a heat exchanger serving to heat the space within the building.

10. A cladding in accordance with claim 9 wherein said heat exchanger is arranged to heat the air within the building.

11. A cladding in accordance with claim 9 wherein said heat exchanger is arranged to transfer heat into a water heating system for said building.

12. A cladding in accordance with claim 9 wherein the movement of said one or more movable members is effected by means of a servo mechanism responsive to the temperature inside and outside the building.

13. A cladding in accordance with claim 1 wherein the acutation of said one or more movable members is effected by means of a servo mechanism responsive to the temperature inside and outside the building.

* * * * *